US012784309B2

(12) United States Patent
Datta et al.

(10) Patent No.: US 12,784,309 B2
(45) Date of Patent: Nov. 3, 2026

(54) SYSTEM AND METHOD FOR COMPUTED TOMOGRAPHY (CT) VALUE ADJUSTMENT IN A CT SCANNER

(71) Applicant: GE Precision Healthcare LLC, Wauwatosa, WI (US)

(72) Inventors: Arka Datta, Pewaukee, WI (US); Brian Nett, Wauwatosa, WI (US); John M Boudry, Waukesha, WI (US)

(73) Assignee: GE Precision Healthcare LLC, Waukesha, WI (US)

( * ) Notice: Subject to any disclaimer, the term of this patent is extended or adjusted under 35 U.S.C. 154(b) by 800 days.

(21) Appl. No.: 18/056,305

(22) Filed: Nov. 17, 2022

(65) Prior Publication Data

US 2024/0169609 A1 May 23, 2024

(51) Int. Cl.
*G06T 11/00* (2026.01)
*G06T 12/10* (2026.01)

(52) U.S. Cl.
CPC .......... *G06T 12/10* (2026.01); *G06T 2210/41* (2013.01)

(58) Field of Classification Search
CPC .. G06T 11/005; G06T 2210/41; G06T 11/006
See application file for complete search history.

(56) References Cited

U.S. PATENT DOCUMENTS

| | | | | |
|---|---|---|---|---|
| 6,188,744 | B1 | 2/2001 | Shinohara et al. | |
| 8,280,127 | B2 | 10/2012 | Dutte et al. | |
| 9,589,374 | B1 | 3/2017 | Gao et al. | |
| 10,758,202 | B2 | 9/2020 | Daerr et al. | |
| 11,222,411 | B2 | 1/2022 | Manhart | |
| 2006/0018439 | A1* | 1/2006 | Tang | A61B 6/027 378/210 |
| 2006/0159223 | A1* | 7/2006 | Wu | A61B 6/482 378/18 |
| 2007/0147580 | A1* | 6/2007 | Wu | A61B 6/583 378/18 |
| 2010/0266190 | A1* | 10/2010 | Zagorchev | G16H 40/63 382/131 |
| 2011/0249879 | A1* | 10/2011 | Wu | G06T 11/005 382/131 |
| 2013/0156163 | A1* | 6/2013 | Liu | G06T 11/005 378/207 |

FOREIGN PATENT DOCUMENTS

| | | | | |
|---|---|---|---|---|
| JP | 2001258875 A * | 9/2001 | | A61B 6/032 |

* cited by examiner

*Primary Examiner* — Edward Park
*Assistant Examiner* — Alexander Joseph Vaughn
(74) *Attorney, Agent, or Firm* — Amin, Turocy & Watson, LLP

(57) ABSTRACT

Computer processing techniques are described for computed tomography (CT) value adjustment of CT images. According to an example, determining, by a system comprising a processor, an adjustment to a calibration vector used to reconstruct CT scan data into first CT image data, wherein determining the adjustment is based on difference between a current CT value of a region in the first CT image data and a target CT value for the region. The method further comprises modifying, by the system, the calibration vector based on the adjustment, resulting in a modified calibration vector, and reconstructing, by the system, the CT scan data into second CT image data using the modified calibration vector, resulting in the region in the second CT image data comprising the target CT value.

20 Claims, 13 Drawing Sheets

801

802

901

902

1001

1002

1101

1102

SYSTEM AND METHOD FOR COMPUTED TOMOGRAPHY (CT) VALUE ADJUSTMENT IN A CT SCANNER

TECHNICAL FIELD

This application relates to medical image processing and more particularly to a system and method for computed tomography (CT) value adjustment in a CT scanner.

BACKGROUND

Computed tomography (CT) has been one of the most successful imaging modalities and has facilitated countless image-based medical procedures since its invention decades ago. CT scanners use an X-ray (XR) tube and a detector on a rotating gantry to measure XR attenuations by different tissues inside the body. The XR tube projects XR photons through the body of the patient and an array of detectors placed in the gantry on the opposite side of the body measure XR attenuations of the photons by different tissues inside the body based on the amount of photons arriving at the detector cells, referred to a projection signals or simply projections. The multiple XR projections taken from different angles are then processed on a computer using reconstruction algorithms to produce tomographic (cross-sectional) images (reconstructed "slices") of the body.

The reconstructed images are measured as a function of the Hounsfield unit (HU), also referred to as the CT value or CT unit. The Hounsfield unit (HU) is a relative quantitative measurement of radio density used by radiologists in the interpretation of CT images. The absorption/attenuation coefficient of radiation within a tissue is used during CT reconstruction to produce a grayscale image. The physical density of tissue is proportional to the absorption/attenuation of the X-ray beam. The HU or CT value is then calculated based on a linear transformation of the baseline linear attenuation coefficient of the XR beam.

In accordance with conventional CT imaging procedures, a calibration step may be performed prior to acquisition of the high-resolution CT scan data for the patient. The calibration step involves using a standard phantom (e.g., a 20 centimeter (cm) water phantom) to calibrate the CT scanner to achieve a desired CT value distribution. However, the precision of the CT values in reconstructed clinical images may vary for several reasons. For example, patient size (and volume) may be different than standard calibration phantom. Additionally, hardware characteristics of the CT scanner may be drifted from the initial calibration state.

The CT values can be readjusted by performing an additional detailed re-calibration and re-scanning the patient. The detailed re-calibration may correct the HU values incorporating the system drift, but unable to compensate if there is significant mismatch between patient size and the original calibration phantom size. Additionally, the detailed re-calibration adds significant down-time for the CT scanning system.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are described that facilitate adjusting the CT values of reconstructed CT images.

According to an embodiment, a system is provided that comprises a memory that stores computer executable components, and a processor that executes the computer executable components stored in the memory. The computer executable components comprise an assessment component that determines an adjustment to a calibration vector used to reconstruct computed tomography (CT) scan data into first CT image data, wherein determining the adjustment is based on difference between a current CT value of a region in the first CT image data and a target CT value for the region. The computer executable components further comprise an adjustment component that modifies the calibration vector based on the adjustment, resulting in a modified calibration vector, and a reconstruction component that reconstructs the CT scan data into second CT image data using the modified calibration vector, resulting in the region in the second CT image data comprising the target CT value.

In some embodiments, elements described in the disclosed systems and methods can be embodied in different forms such as a computer-implemented method, a computer program product, or another form.

DETAILED DESCRIPTION

Figure 1:
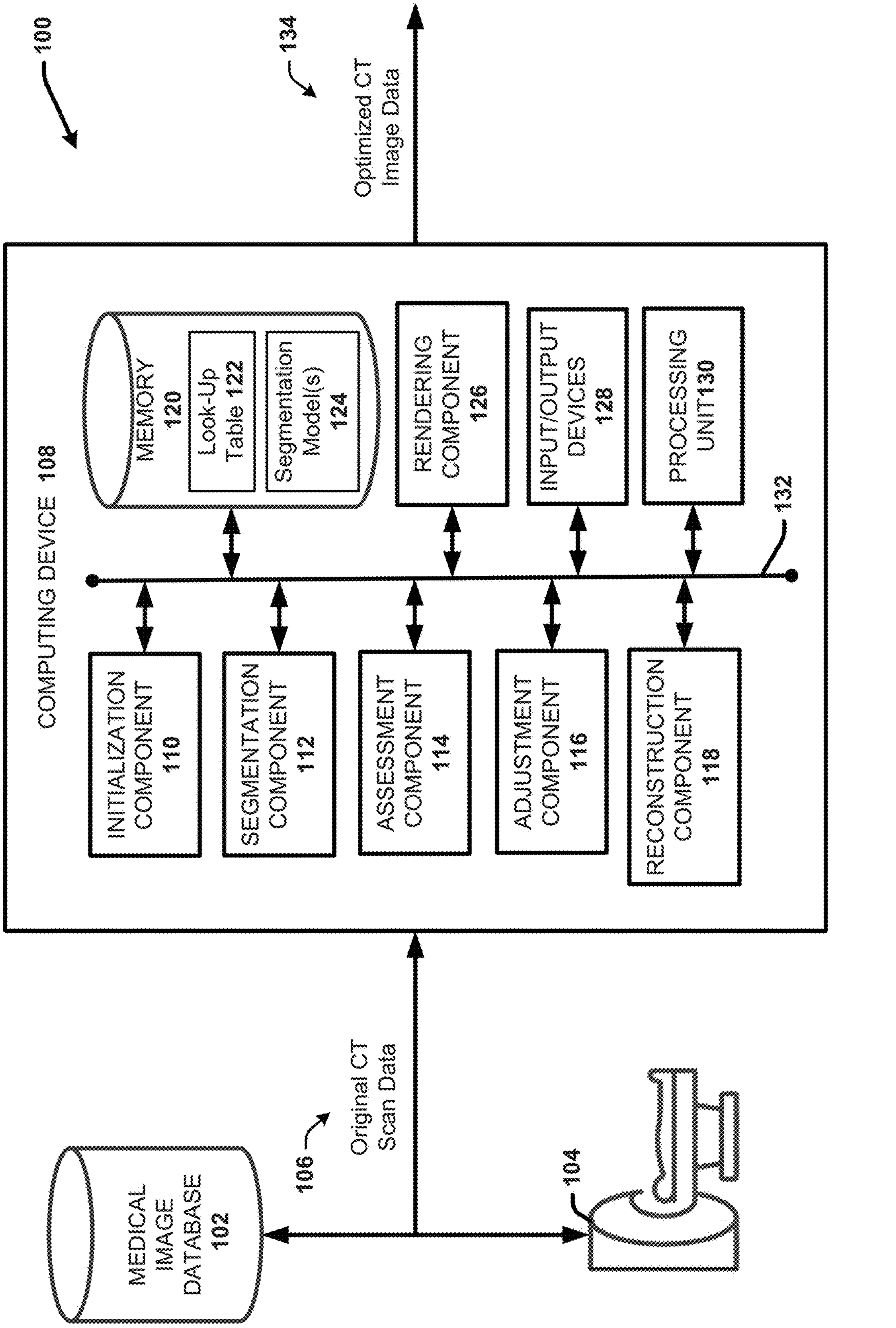
FIG. 1 presents an example system that facilitates adjusting the CT values of CT images in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background section, Summary section or in the Detailed Description section.

The disclosed subject matter is directed to systems, computer-implemented methods, apparatus and/or computer program products that provide computer processing techniques for adjusting CT values of CT images reconstructed from the original CT scan data. In particular, the disclosed techniques provide for adjusting the original CT values by an amount determined to achieve a target CT value associated with a uniform anatomical region in the reconstructed images based on the original or current CT value associated with the information anatomical region. The target CT value corresponds to the correct or preferred CT value for the uniform anatomical region in the reconstructed CT images.

In this regard, the current CT value and the target CT value may be extracted for any defined or uniform anatomical region in the reconstructed images that typically does not vary for different patients, such as regions corresponding to organs, spinal fluid, and other uniform anatomical features (e.g., as contrasted to lesions and other non-uniform anatomical features which vary from patient to patient). The uniform anatomical region may be selected via manual input or automatically based on segmentation of the original CT image data using one or more segmentation models (e.g., organ segmentation models or the like). The target CT value for the uniform anatomical region may be provided as manual input (e.g., based on the radiologist's or technician's known expertise regarding the preferred CT value for a particular uniform anatomical feature) and/or determined by the system automatically using a predefined reference table that correlates known uniform anatomical features with reference target CT values. The current CT value for the uniform anatomical region can be calculated or determined based on the original CT scan data (i.e., projection data). The original CT scan data also includes (as metadata), the original calibration vector applied to the original scan data in association with reconstructing the original CT scan data into CT images in accordance with conventional CT reconstruction techniques (e.g., forward projection and/or reverse projection).

In accordance with one or more embodiments, given the original calibration vector, an HU characterization curve or transfer function is calculated, which performs a mapping operation between resulting CT values of the uniform anatomical region of CT images reconstructed from the original scan data with different gain values applied to the calibration vector. Then, the characterization curve or transfer function is used to calculate the gain required to achieve the target CT value based on the current CT value. The original calibration vector is then modified to account for the gain. The original scan-data is then reconstructed with the modified calibration vector to achieve the correct CT value in the reconstructed image.

The novelty of this invention is the holistic framework for readjusting an image quality parameter (e.g., CT value) to improve diagnostic robustness by exploring and using the mathematical property (i.e., establishing a transfer function, no additional scans etc.) of the underlying metadata (e.g., the calibration vector). This method will aid as a tool to readjust the CT number without requiring any additional calibration scans. Additionally, this method can also be integrated into the CT scanner reconstruction chain to improve the CT number accuracy automatically, thus, improving system reliability, product efficiency, diagnostic capability, system robustness, and final image quality.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 presents an example system 100 that facilitates adjusting the CT values of CT images in accordance with one or more embodiments of the disclosed subject matter. Embodiments of systems described herein can include one or more machine-executable or computer-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

In this regard, system 100 comprises a computing device 108, a CT imaging system 104 and a medical image database 102. The computing device 108 is adapted to process original CT scan data 106 provided by the CT imaging system 104 or the medical image database 102 using the disclosed CT value adjustment process to convert the original CT scan data 106 into optimized CT image data 134. As described in greater detail below, the optimized CT image data 134 comprises one or more CT images with adjusted CT values relative to corresponding CT images included with and/or generated from the original CT scan data 106.

To facilitate this end, the computing device 108 includes machine-executable components configured to perform various aspects of the CT value adjustment process disclosed herein. The machine-executable components include initialization component 110, segmentation component 112, assessment component 114, adjustment component 116, reconstruction component 118, and rendering component 126. These computer/machine executable components (and other described herein) can be stored in memory associated with the one or more machines. The memory can further be operatively coupled to at least one processor, such that the components can be executed by the at least one processor to perform the operations described. For example, in some embodiments, these computer/machine executable components can be stored in memory 120 of the computing device 108 which can be coupled to processing unit 130 for execution thereof. Examples of said and memory 120 and processing unit 130 as well as other suitable computer or computing-based elements, can be found with reference to FIG. 13, and can be used in connection with implementing one or more of the systems or components shown and described in connection with FIG. 1 or other figures disclosed herein.

The computing device 108 further includes input/output devices 128 and a device bus 132 that communicatively and operatively couples the machine executable components (e.g., initialization component 110, segmentation component 112, assessment component 114, adjustment component 116, reconstruction component 118, and rendering component 126), the memory, the input/output devices 128 and the processing unit 130 to one another. The input/output devices 128 can include any suitable input device that facilities receiving user input (e.g., a keyboard, a touchscreen, a touchpad, etc.) and any suitable output device that facilitate rendering data (e.g., a display, a speaker, etc.). In various embodiments, the input/output devices 128 may comprise at least one graphical display capable of rendering medical image data (e.g., optimized CT image data 134). In this regard, the computing device 108 may be or include any suitable computing device (e.g., a laptop computer, a desktop computer, a virtual computer, a smartphone, a tablet, a server, etc.)

The architecture of system 100 may vary. In this regard, the computing device 108 may be operatively and communicatively coupled to the CT imaging system 104 and/or the medical image database 102 via any suitable wired or wireless communication technology. In some embodiments, the computing device 108 corresponds to a local computing device located at or near the CT imaging system 104 that is employed by a radiologist or imaging technician to control the CT scanning procedure performed using the CT imaging system 104, generate reconstructed CT images from the scan data captured via the CT imaging system 104 and display the reconstructed images. With these embodiments, the computing device 108 can be considered part of the CT imaging system 104. In other embodiments, the computing device 108 may be remote from the CT imaging system 104 and/or the medical image database 102 and communicatively coupled thereto via one or more communication networks (e.g., the Internet and/or another communication network.

The original CT scan data 106 may include original CT scan data captured by the CT imaging system 104 in accordance with a conventional CT scanning procedure and received by the computing device 108 directly from the CT imaging system 104. Additionally, or alternatively, the original CT scan data 106 may include original CT scan data captured by the CT imaging system 104 or another CT scanner in accordance with a conventional CT scanning procedure and saved in the medical image database 102. In other embodiments, the original CT scan data 106 may be stored locally in memory 120.

The original CT scan data 106 may comprise the original (raw or unprocessed) projection data captured during the CT scanning process and/or one or more reconstructed CT images generated from the original projection data (e.g., previously reconstructed or reconstructed by the computing device 108 using reconstruction component 118). The original CT scan data 106 can also include the calibration vector generated for the CT scan in association with an initial phantom calibration process performed prior to scanning the patient. The calibration vector may be included with the original CT scan data 106 as metadata.

In this regard, in accordance with conventional CT scanning procedures, the patient is centered on a motorized scanning table through a circular opening in the CT imaging system 104. As the patient passes through the CT imaging system 104 via the motorized scanning table (e.g., incrementally forward or backward to generate different tube positions relative to the body of the patient) an XR tube providing a source of XRs rotates around the inside of the circular opening. The XR tube produces a narrow, fan-shaped beam of XRs through an anatomical slice of interest, and the resulting XRs are captured on a detector on the opposite side of the XR source as a projection image comprising a plurality of projections respectively corresponding to an amount of photons absorbed by respective tissues in the body. The number of projections obtained for each projection image (e.g., corresponding to depends on the configuration of the detector cells, which can include an array of one or more rows and columns of cells. The source-detector combination is made to rotate in a full circle around the patient, so as to capture a large number of projection images corresponding to different anatomical slices of the scanned anatomy. The aggregated slices correspond to a three-dimensional (3D) or volume representation of the scanned patient anatomy. This constitutes the image acquisition aspect of CT.

The image acquisition step is followed by a reconstruction step, where a CT reconstruction algorithm are used to convert the projection images into grayscale images representing the anatomical details of the imaged slice. The reconstructed images are measured as a function of the Hounsfield unit (HU), also referred to as the CT value or CT unit. The Hounsfield unit (HU) is a relative quantitative measurement of radio density used by radiologists in the interpretation of CT images. The absorption/attenuation coefficient of radiation within a tissue is calculated during CT reconstruction to produce a grayscale image. The physical density of tissue is proportional to the absorption/attenuation of the X-ray beam. The HU or CT value is then calculated based on a linear transformation of the baseline linear attenuation coefficient of the XR beam. In this regard, each reconstructed CT image has a corresponding projection image representation corresponding to the two-dimensional (2D) array of CT values captured/detected at the detector cells for a particular at CT image slice perspective (i.e., position and orientation).

In accordance with the disclosed techniques, calibration vectors are applied to the projection data prior to the reconstruction algorithm to compensate for any deviation of values attributed to the CT imaging system (e.g., detector non-linearity, XR beam spectral change, gantry angular dependency). The calibration vector is calculated during a calibration procedure performed prior to the patient scan. The calibration process usually involves using a standard phantom (e.g., a 20 cm water phantom) to calibrate the CT scanner to achieve a desired CT value distribution. As noted above, the calibration vector may be included with the original CT scan data 106 as metadata. For example, the calibration vector typically comprises an array of calibration values corresponding to respective equivalent detector dimensions.

In this regard, in some embodiments, the original CT scan data 106 may include the original projection data (i.e., the collection of projection images) and the original calibration vector, and the reconstruction component 118 can generate original CT images therefrom using the calibration vector and a CT reconstruction algorithm. In other implementations, the original CT scan data 106 may include the original CT images (e.g., as previously generated by the computing device 108 and/or another computing device). The term "original CT image" is used herein to refer to a CT image reconstructed from the original CT projection data with the original calibration vector in accordance with conventional CT imaging reconstruction procedures. The term "optimized CT image data" is used herein to refer to one or more optimized CT images reconstructed (e.g., by the reconstruction component 118) from the original CT projection data with a modified or adjusted version of the original calibration vector in accordance with the disclosed CT adjustment process.

At a high level, the disclosed CT adjustment process comprises determining (e.g., by the assessment component 114), an adjustment to the original calibration vector included in the original scan data 106 based on an amount of gain required to achieve a target CT value (also referred to as the CT number or HU value). The adjustment component 116 then modifies or adjusts the calibration vector based on the adjustment (i.e., the amount of gain), resulting in a modified calibration vector. The reconstruction component 118 then applies the modified calibration vector to the original CT projection data in association with performing CT image reconstruction using a conventional algorithm to generate the optimized CT image data 134.

In one or more embodiments, the assessment component 114 determines the amount of gain required to achieve the target CT value based on a current CT value for a uniform region of an original CT image reconstructed with the original calibration vector, wherein the target CT value corresponds to the correct or ideal CT value for the uniform region. To facilitate this end, the uniform region must be identified or selected in the original CT image data and thereafter the corresponding CT value of one or more points or pixels in the uniform region can be extracted from the original CT scan projection data (e.g., by the initialization component 110). The uniform region can correspond to any defined or uniform anatomical region or feature in the reconstructed CT images that typically does not vary for different patients, such as regions corresponding to organs, spinal fluid, and other uniform anatomical features (e.g., as contrasted to lesions and other non-uniform anatomical features which vary from patient to patient). In some embodiments, the uniform region may be selected via manual input (e.g., as facilitated by the initialization component 110) in association with presenting (e.g., via rendering component 126) an original CT image to the user (e.g., the radiologist, the imaging technician, etc.) and allowing the user to select the uniform region directly on the rendered CT image. With these embodiments, the initialization component 110 can receive the user input indicating the uniform anatomical region and determine the corresponding current CT for the uniform anatomical region.

In other embodiments, the uniform region may be selected automatically by the initialization component 110 based on segmentation of the original CT image data using one or more segmentation models 124 stored in memory 124 (e.g., organ segmentation models, deep learning-based segmentation models, traditional segmentation models, or the like). With these embodiments, the segmentation component 112 applies one or more of the segmentation models 124 to an original CT image to automatically segment and identify one or more uniform anatomical regions. For example, the one or more segmentation models can comprise anatomical segmentation models adapted to generate segmentation masks over the CT image corresponding to one or more known, uniform anatomical features. The initialization component 110 can further select one or more or the segmented uniform anatomical features as the uniform anatomical region and extract the corresponding current CT value from the original CT projection data for the uniform anatomical region.

The target CT value for the uniform region may be provided and received by the initialization component 110 as manual input (e.g., based on the radiologist's or technician's known expertise regarding the preferred CT value for a particular uniform anatomical feature) and/or determined by the initialization component 110 automatically using a predefined look-up table 122 stored in memory 122 that correlates known uniform anatomical features or regions in CT images with reference target CT values. For example, the look-up table 122 may include a list of known anatomical features and/or regions in that appear in CT images, such as a list of organs for instance, and preferred (e.g., optimal or correct) CT values for the respective anatomical features and/or regions. With these embodiments, based on selection of a uniform anatomical region or feature in an original CT image (e.g., via manual input and/or automatically via segmentation component 112), the initialization component 110 can extract the corresponding target CT value for the particular uniform anatomical region or feature as provided in the look-up table 122.

In accordance with one or more embodiments, the assessment component 114 determines the adjustment to the original calibration vector based on a gain value determined to achieve the target CT value for the uniform region based on the current CT value for the uniform anatomical region. To facilitate this end, the assessment component 114 first generates (or determines/calculates) a characterization curve or transfer function that relates different candidate gain values applied to the calibration vector to corresponding CT values in reconstructed CT images reconstructed by the reconstruction component 118 from the original CT scan projection data (e.g., included in the original CT scan data 106) with respective versions of the calibration vector at the different candidate gain values. The assessment component 114 then uses the characterization curve or transfer function to calculate or determine the gain required to achieve the target CT value for the uniform region based on the current CT value for the uniform region. The adjustment component 116 further modifies the original calibration vector to account for the gain, resulting in generation of the modified calibration vector. The reconstruction component 118 then reconstructs the original scan projection data into the optimized CT image data 134 using the modified calibration vector and a CT reconstruction algorithm (e.g., forward projection, reverse projection, etc.). As a result, the optimized CT image data 134 comprises one or more optimized CT images with the target CT value for the uniform region. The optimized CT image data 134 may include optimized CT images across the entirety of the scanned volume (e.g., a plurality of 2D CT images corresponding to respective scan slices of the scan volume) or a subset of optimized CT images (e.g., one or more) corresponding to one or more selected scan slices for optimization (e.g., as selected based on manual input received via the initialization component 110). The optimized CT image data 134 and the modified calibration vector may be saved (e.g., with the original CT scan data 106 in the medical image database 102 and/or memory 120), rendered (e.g., via rendering component 126 and a graphical display of the computing device 108), and/or sent (e.g., transmitted via any suitable wired or wireless communication technology) to another device for rendering and/or additional processing.

Figure 2:
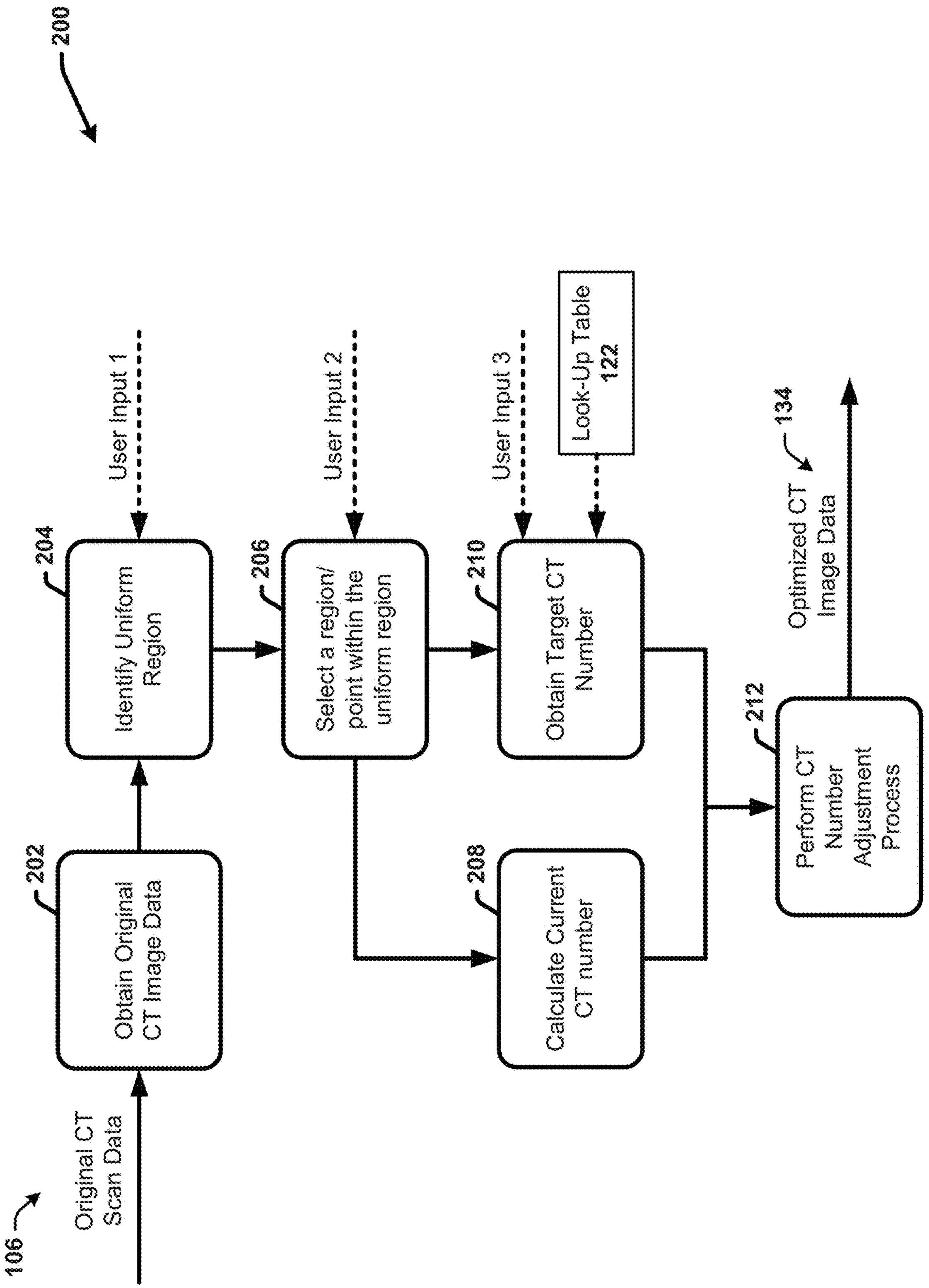
FIG. 2 presents a high-level flow diagram of an example manually assisted process for adjusting the CT values of CT images in accordance with one or more embodiments of the disclosed subject matter.

FIG. 2 presents a high-level flow diagram of an example manually assisted process 200 for adjusting the CT values of CT images in accordance with one or more embodiments of the disclosed subject matter. Process 200 corresponds to an example process that can be performed by the computing device 108 using initialization component 110, assessment component 114, adjustment component 116 and reconstruction component 118. Repetitive description of like elements employed in respective embodiments is omitted for sake of brevity. The manual assistance aspect of process 200 involves receiving user input in association with selecting the uniform region and optionally providing the target CT value for the uniform region.

With reference to FIGS. 1 and 2, in accordance with process 200, at 202, original CT image data is obtained in association with the original CT scan data 106. For example, the original CT image data corresponds to one or more original CT images reconstructed from the original projection data (e.g., included in the original CT scan data 106) using the original calibration vector. In some implementations, the one or more original CT images may be included in the original CT scan data 106 as received by the computing device 108. In other implementations, at 202 the reconstruction component 118 can generate/reconstruct the one or more original CT images from the received projection data included in the original CT scan data using the original calibration vector, also included in the original CT scan data 106. At 204, the initialization component 110 receives user input (e.g., user input 1) identifying a uniform region on one (or more) of the original CT images as displayed to the user. At 206, the initialization component 110 additionally or alternatively receives user input (e.g., user input 2) selecting a region or point (e.g., an image pixel for example) within the uniform region. At 208, the initialization component calculates or otherwise determines the current CT number for the selected region/point. For example, the initialization component can determine the current CT value for the selected point/region from the corresponding original projection data. At 210, the initialization component further obtains target CT number for the selected region/point. In some implementations, the target CT number can also be received as user input (e.g., user input 3) based on expertise of the user (e.g., a radiologist, an imaging technician etc.). In other implementations, the initialization component 110 can determine the target CT number for the selected point/region from the look-up table 122.

At 212, the CT number adjustment process is performed by the assessment component 114, the adjustment component 116 and the reconstruction component 118 to generate the optimized CT image data 134. As described above and further described infra with reference to FIGS. 5-7, the CT number adjustment process involves generating a transfer function that relates different gain values applied to the original calibration vector to resulting CT values of the uniform region in CT images reconstructed with version of the original calibration vector at the different gain values. The CT number adjustment process further involves employing the transfer function to determining a gain value for the calibration vector that results in achieving the target CT value in the uniform region, modifying the calibration vector based on the gain value, and employing the modified calibration vector to generate the optimized CT image data 134 form the original scan projection data.

Figure 3:
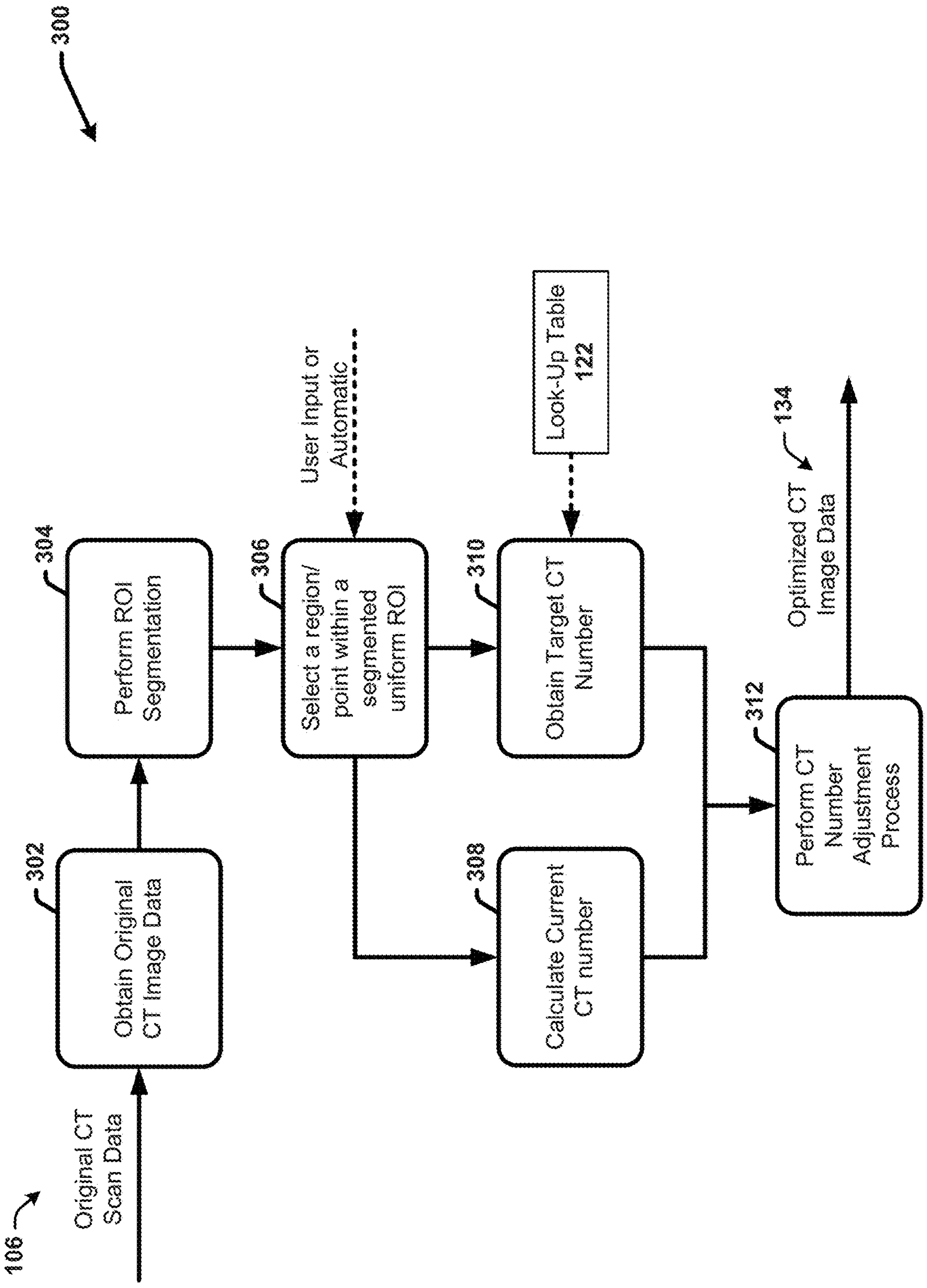
FIG. 3 presents a high-level flow diagram of an example automated process for adjusting the CT values of CT images in accordance with one or more embodiments of the disclosed subject matter.

FIG. 3 presents a high-level flow diagram of an example automated process for adjusting the CT values of CT images in accordance with one or more embodiments of the disclosed subject matter. Process 300 corresponds to an example process that can be performed by the computing device 108 using initialization component 110, segmentation component 112, assessment component 114, adjustment component 116 and reconstruction component 118. Repetitive description of like elements employed in respective embodiments is omitted for sake of brevity.

With reference to FIGS. 1 and 3, in accordance with process 300, at 302, original CT image data is obtained in association with the original CT scan data 106. For example, the original CT image data corresponds to one or more original CT images reconstructed from the original projection data (e.g., included in the original CT scan data 106) using the original calibration vector. In some implementations, the one or more original CT images may be included in the original CT scan data 106 as received by the computing device 108. In other implementations, at 302 the reconstruction component 118 can generate/reconstruct the one or more original CT images from the received projection data included in the original CT scan data using the original calibration vector, also included in the original CT scan data 106.

At 306, the segmentation component 112 performs region of interest (ROI) segmentation on one or more of the original CT images. The ROI segmentation corresponds to identifying one or more defined ROIs in an original CT image that correspond to a uniform anatomical region or feature (e.g., a specific organ, or another specific anatomical feature) using one or more ROI segmentation models (e.g., a deep learning based anatomical segmentation model or a conventional segmentation model). The particular ROI will vary based on the type of the CT scan (e.g., the particular anatomical region scanned). At 306, the initialization component 110 or the segmentation component can further select a region or point (e.g., an image pixel for example) within the segmented ROI. (Additionally, or alternatively, this step can be performed vi user input). At 308, the initialization component calculates or otherwise determines the current CT number for the selected region/point. At 310, the initialization component 310 further obtains target CT number for the selected region/point from the look-up table 122. At 312, the CT number adjustment process is then performed by the assessment component 114, the adjustment component 116 and the reconstruction component 118 to generate the optimized CT image data 134. As described above and further described infra with reference to FIGS. 5-7.

Figure 4:
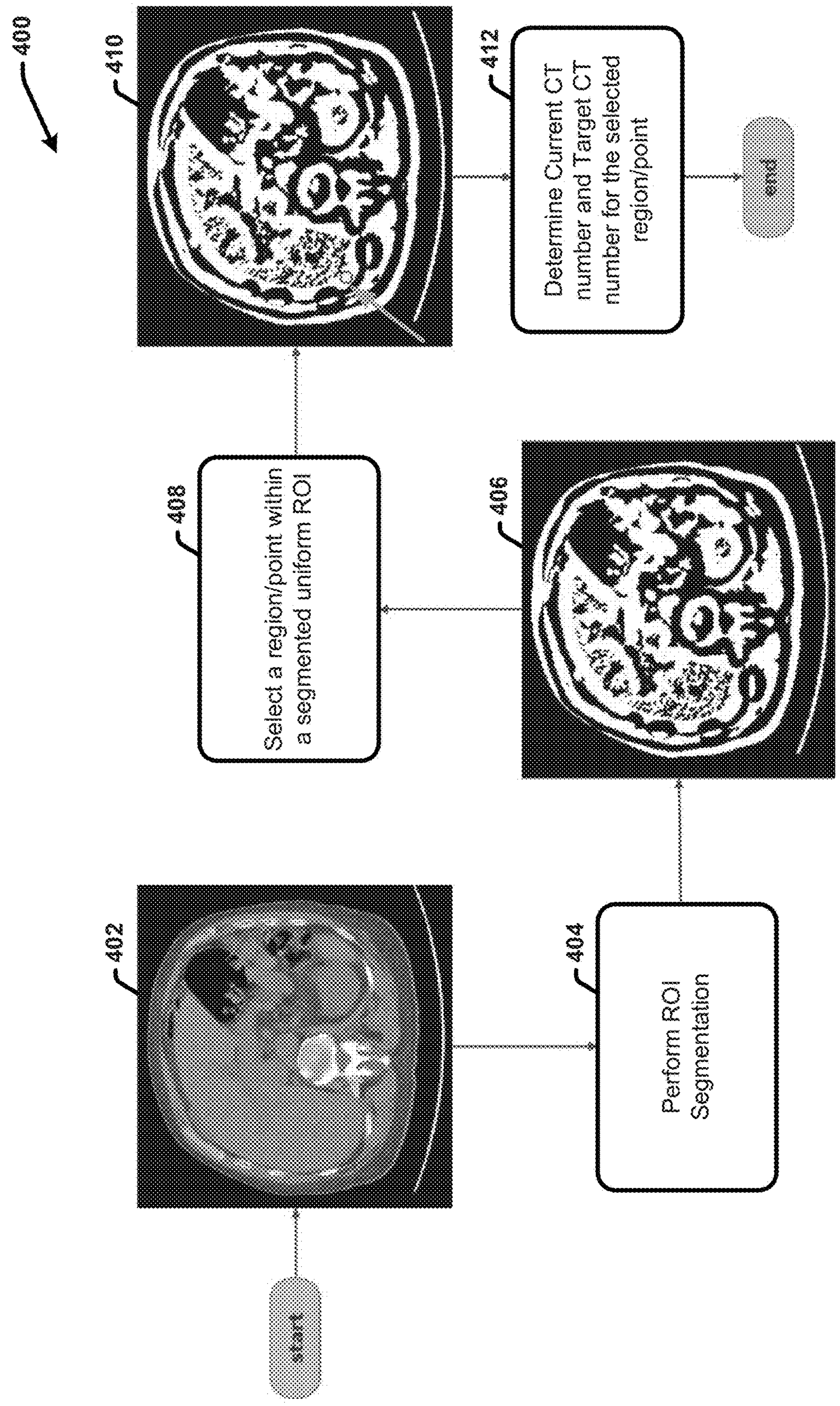
FIG. 4 presents a flow diagram illustrating usage of a segmentation model to facilitate adjusting the CT values of CT images in accordance with one or more embodiments of the disclosed subject matter.

FIG. 4 presents a flow diagram of an example process 400 illustrating usage of a segmentation model to facilitate adjusting the CT values of CT images in accordance with one or more embodiments of the disclosed subject matter. With reference to FIGS. 1, 3 and 4, in one or more embodiments, process 400 corresponds to steps 302-310 of process 300. As illustrated in FIG. 4, process 400 begins with obtaining an original CT image 402 associated with received original CT scan data. In this example, the original CT image 402 comprises an axial representation of the abdomen/pelvis. It should be appreciated however that the disclosed techniques can be applied to any type of CT scan depicting any anatomical region of the body. At 404, ROI segmentation is performed on the CT image 402 by the segmentation component 112 using one or more ROI segmentation models 124 resulting in a segmentation image 406. In this example, the one or more ROI segmentation models correspond to a segmentation models configured to identify defined anatomical features represented in the CT image 402. At 408, a region or point within a segmented uniform ROI is selected (e.g., by the segmentation component 112) based on predefined information associated with the ROI segmentation model indicating anatomical ROI or features corresponding to uniform regions. Segmentation image 410 illustrates one example of a selected point (e.g., represented by the small circle at which the grey arrow is pointing towards) within a uniform region, which in this example corresponds to the liver. At 412, the initialization component 110 further determines the current CT number (e.g., using the corresponding original projection data) and the target CT number (e.g., via the look-up table 122) for the selected region/point.

Figure 5:
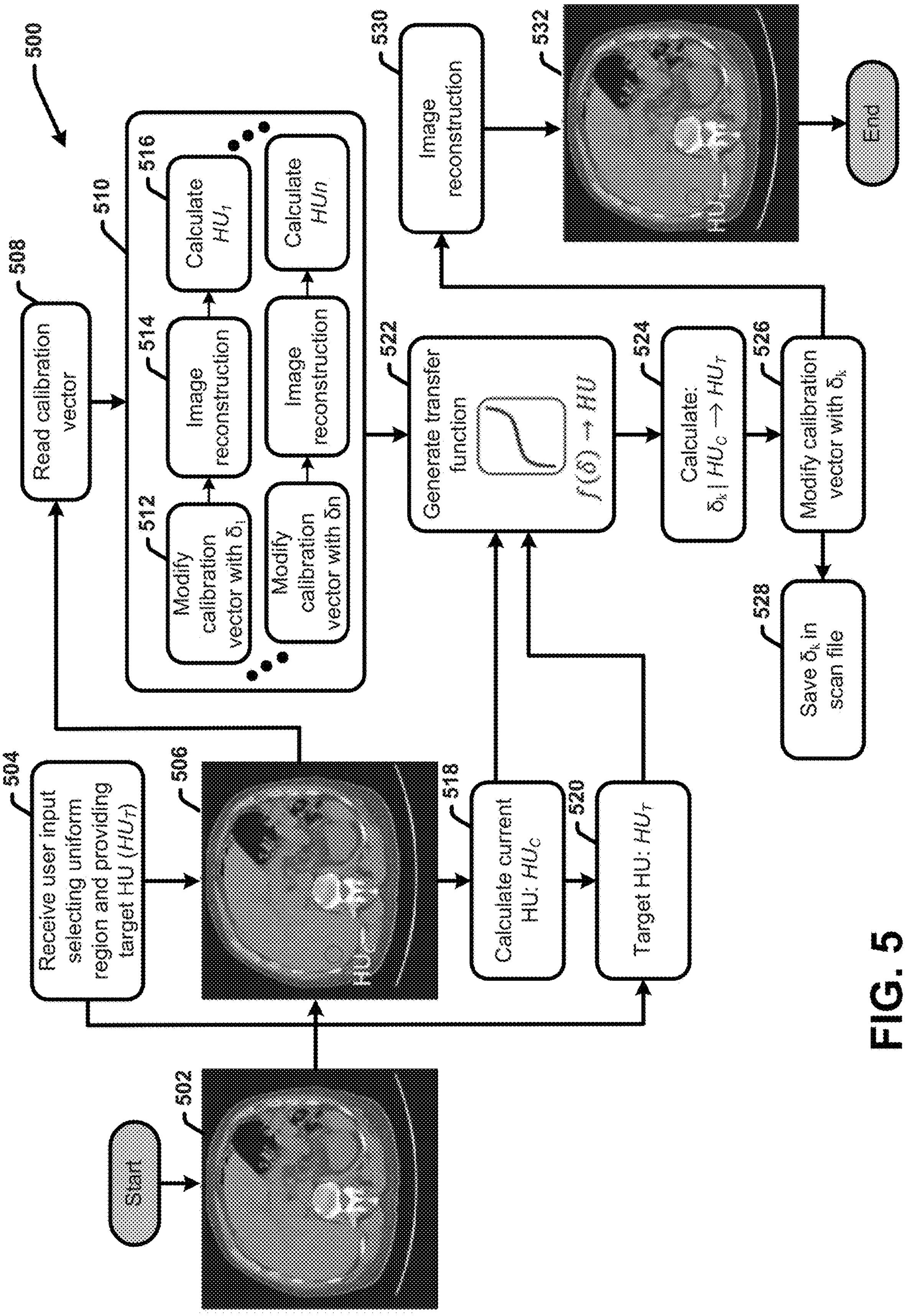
FIG. 5 presents a flow diagram of another example manually assisted process for adjusting the CT values of CT images in accordance with one or more embodiments of the disclosed subject matter.

FIG. 5 presents a flow diagram of another example manually assisted process 500 for adjusting the CT values of CT images in accordance with one or more embodiments of the disclosed subject matter. With reference to FIGS. 1, 2 and 5, process 500 comprises same or similar aspects of process 200 with the addition of some additional details regarding the CT number adjustment process performed at 212. Repetitive description of like elements employed in respective embodiments is omitted for sake of brevity.

As illustrated in FIG. 5, process 500 begins with obtaining an original CT image 502 associated with received original CT scan data. In this example, the original CT image 502 comprises an axial representation of the abdomen/pelvis. In accordance with process 500, the original CT image 502 is rendered on a display (e.g., of the computing device 108 for example) and presented to a user. At 504, user input is received (e.g., via the initialization component 110) selecting a point or region (e.g., indicated by the circle in mark-up image 506) on a uniform area of the original CT image 502, which in this case corresponds to a point on the liver. At 518, the current HU value ($HU_c$) for the selected point is calculated (e.g., by the initialization component 110) based on the corresponding original projection data. At 520, the target HU value ($HU_T$) for the selected point is obtained either via user input and/or via the look-up table 122.

At 508, the initialization component 110 obtains the original calibration vector used to generate the original CT image 502. For example, the original calibration vector can be read from or otherwise extracted from the metadata associated with the original CT image 502. At 510, the assessment component 114 performs an iterative process using the adjustment component 116 and the reconstruction component 118. The iterative process involves modifying the calibration vector at 512 with a first candidate gain value, referred to herein as delta1 or $\delta_1$, resulting in a first modified calibration vector. At 514, the reconstruction component 118 generates a first reconstructed version of the original CT image 502 with the first modified calibration vector. At 516, the assessment component calculates the resulting HU value ($HU_1$) of the uniform region in the first reconstructed version of the original CT image 502. This process is performed iteratively a plurality of times with different candidate gain values $\delta_1$-$\delta_n$, wherein the number (n) can vary, yet is preferably between about 10 and 100). The result of the iterative process at 510 comprises a plurality of different gain values $\delta_1$-$\delta_n$ and their respective resulting HU values (i.e., $HU_{1-n}$).

At 522, the assessment component 114 employs the different gain values $\delta_1$-$\delta_n$ and their respective resulting HU values (i.e., $HU_{1-n}$) to generate a transfer function that performs a mapping operation between an HU value with gain in a specific calibration vector. Then at 524, the assessment component 114 employs the transfer function to calculate the final gain value ($\delta_k$) required to achieve the target HU value ($HU_T$) given the current HU value ($HU_C$). At 526, the adjustment component 116 modifies the original calibration vector with the final gain value $\delta_k$ to generate the final modified calibration vector. At 528, the final gain value $\delta_k$ may be saved with the original scan file. At 530 the reconstruction component 118 performs image reconstruction on the original scan data (e.g., the projection data corresponding to the original CT image 502) using the final modified calibration vector and a CT reconstruction algorithm (e.g., forward projection, reverse projection, etc.) to generate on optimized version 532 of the original CT image 502, wherein the optimized version 532 comprises the target CT value in the uniform region.

Figure 6:
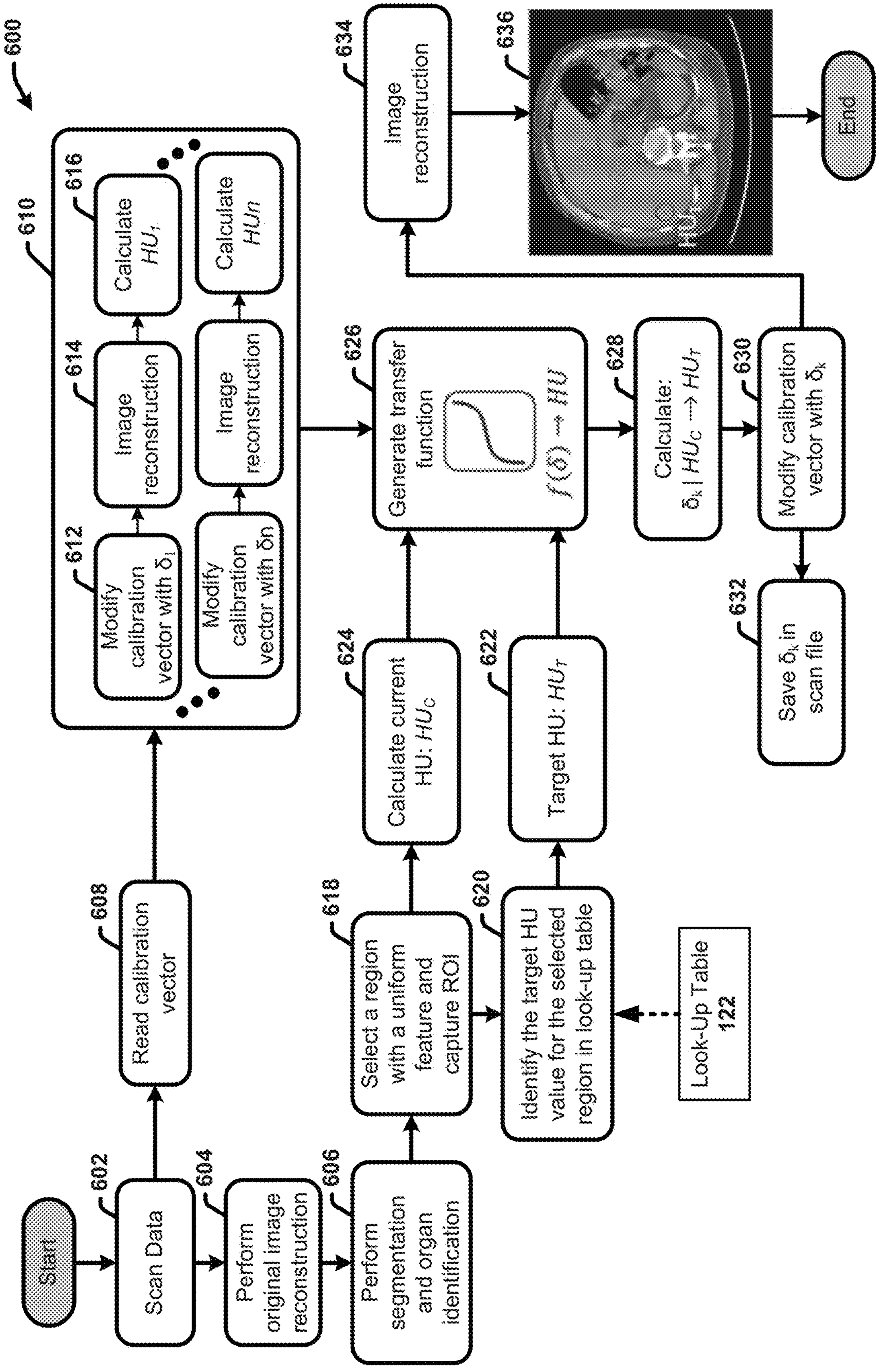
FIG. 6 presents a flow diagram of another example automated process for adjusting the CT values of CT images in accordance with one or more embodiments of the disclosed subject matter.

FIG. 6 presents a flow diagram of another example automated process 600 for adjusting the CT values of CT images in accordance with one or more embodiments of the disclosed subject matter. With reference to FIGS. 1, 3 and 5, process 600 comprises same or similar aspects of process 300 with the addition of some additional details regarding the CT number adjustment process performed at 312. Repetitive description of like elements employed in respective embodiments is omitted for sake of brevity.

Process 600 begins with obtaining original scan data at 602 corresponding to original CT scan data 106. At 604, the reconstruction component 118 performs conventional CT reconstruction of the original scan data (i.e., the projection data) using the original calibration vector and a conventional CT reconstruction algorithm to generate one or more original CT images. At 606, the segmentation component 112 performs segmentation (e.g., deep learning based or another automatic segmentation method) and organ identification on the one or more original CT images using one or more segmentation models 124. At 618, the segmentation component 112 selects a region on the one or more original CT images corresponding to a uniform feature based on the segmentation results and captures the ROI. At 620, the initialization component 110 employs the look-up table 122 to determine the target HU value ($HU_T$) for the selected uniform feature. At 624, the initialization component 110 calculates the current HU value for the selected uniform feature (HUc).

At 608, the initialization component 110 obtains the original calibration vector associated with the original scan data 602. At 610, the assessment component 114 performs an iterative process using the adjustment component 116 and the reconstruction component 118. The iterative process involves modifying the calibration vector at 612 with a first candidate gain value, referred to herein as delta1 or $\delta_1$, resulting in a first modified calibration vector. At 614, the reconstruction component 118 generates a first reconstructed version of the original CT image 502 with the first modified calibration vector. At 616, the assessment component calculates the resulting HU value ($HU_1$) of the uniform region in the first reconstructed version of the original CT image 502. This process is performed iteratively a plurality of times with different candidate gain values $\delta_1$-$\delta_n$, wherein the number (n) can vary, yet is preferably between about 10 and 100). The result of the iterative process at 610 comprises a plurality of different gain values $\delta_1$-$\delta_n$ and their respective resulting HU values (i.e., $HU_{1-n}$).

At 626, the assessment component 114 employs the different gain values $\delta_1$-$\delta_n$ and their respective resulting HU values (i.e., $HU_{1-n}$) to generate a transfer function that performs a mapping operation between an HU value with gain in a specific calibration vector. Then at 628, the assessment component 114 employs the transfer function to calculate the final gain value ($\delta_k$) required to achieve the target HU value ($HU_T$) given the current HU value ($HU_C$). At 630, the adjustment component 116 modifies the original calibration vector with the final gain value $\delta_k$ to generate the final modified calibration vector. At 632, the final gain value $\delta_k$ may be saved with the original scan file. At 634 the reconstruction component 118 performs image reconstruction on the original scan data using the final modified calibration vector and a CT reconstruction algorithm (e.g., forward projection, reverse projection, etc.) to generate on optimized version 636 of the one or more of the original CT images reconstructed at 604, wherein the optimized version 636 comprises the target CT value in the uniform region.

Figure 7:
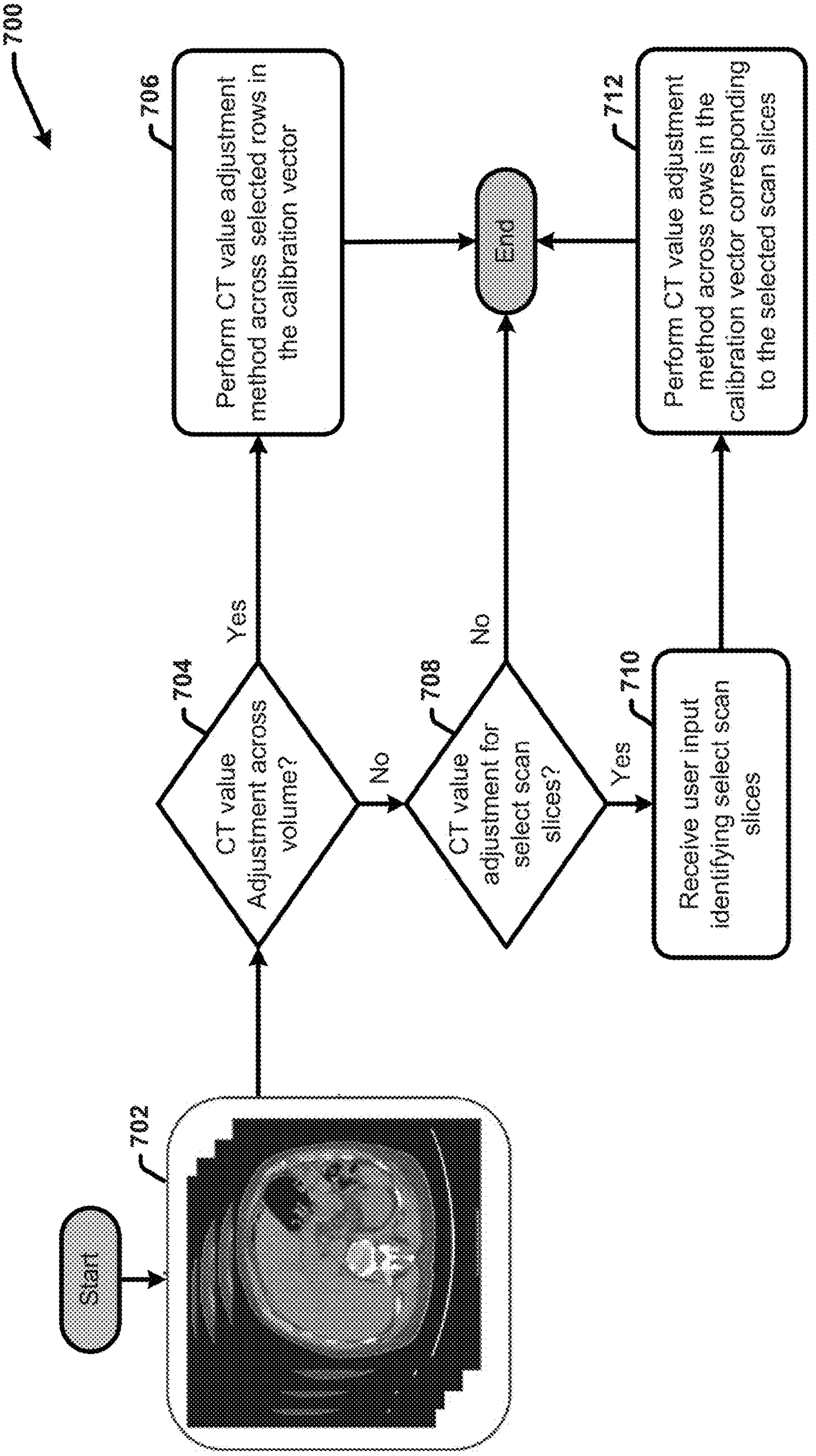
FIG. 7 presents a flow diagram illustrating application of the proposed techniques for CT value adjustment on selected CT images as well as across the whole scanned volume.

FIG. 7 presents a flow diagram of an example workflow 700 illustrating application of the proposed techniques for CT value adjustment on selected CT images as well as across the whole scanned volume. With reference to FIGS. 1-7, as noted above, the optimized CT image data 134 can comprise all or a subset of CT scan slices corresponding to the scanned anatomical volume. In this regard, as noted above, the size of the original calibration vector included with the original CT scan data 106 can represent the entire volume of the scanned patient anatomy. For example, the calibration vector may comprise a 2D or 3D array of calibration values comprising a plurality of different rows of calibration values respectively aligned with the scan slices which correspond to the 2D reconstructed CT images.

In some implementations, a user (e.g., the radiologist, the imaging technician, etc.) may desire to optimize all of the scan slices represented in the scanned 3D volume. With these implementations, the entire modified calibration vector can be applied to the entirety of the scan data corresponding to the entire scanned volume to generate optimized CT images for the entire scan series. In other implementations, the user may desire to optimize a single scan slice or a select subset of two or more scan slices. With these implementations, the user can indicate the particular original CT image or images that they would like to optimize prior to application of the modified calibration vector to any of the original scan data (e.g., at initialization of process 500 or process 600 for example, or at any point prior to the image reconstruction step at 530 or 634 for instance). The reconstruction component 118 can further identify the particular row of the modified calibration vector comprising the subset of calibration values that apply to the selected CT image for optimizing. The reconstruction component 118 can further apply only the subset of the calibration values included in the corresponding row to the subset of the original scan data corresponding to the selected original CT image to generate an optimized version of the selected CT image.

For example, as illustrated in workflow 700, the original CT scan data 106 may include a series of original CT images 702 corresponding to respective original CT scan slices of a scanned 3D anatomical volume. At 704, prior to performing the image reconstruction with the modified calibration vector, the initialization component 110 can receive user input indicating whether they would like to perform CT number adjustment across the entire volume or one or more selected scan slices. Based on received user input indicating the entire scan volume is desired, workflow 700 proceeds to 706 wherein the computing device 108 performs the disclosed assistive CT adjustment method across all rows in the calibration vector. However, based on received user input indicating the entire volume is not desired, workflow 700 proceeds to 708 wherein user input is received indicating whether they would like to perform CT value adjustment on one or more select scan slices. At 708, based on received user input indicating they would like to perform CT value adjustment on one or more select scan slices, workflow 700 proceeds to 710, wherein user input is received identifying the select scan slices. Then at 712, the computing device 108 performs the disclosed assistive CT adjustment method across the corresponding row or rows in the calibration vector that correspond to the selected scan slice or slices.

FIGS. 8A-11B present example CT images before and after CT value adjustment in accordance with one or more embodiments of the disclosed subject matter. In FIGS. 8A-11B, respective CT images corresponding to the original CT image prior to optimization using the disclosed techniques are represented in FIGS. 8A, 9A, 10A and 11A. The corresponding updated versions the original CT images after CT value adjustment are represented in FIGS. 8B, 9B, 10B and 11B.

Figure 8A:
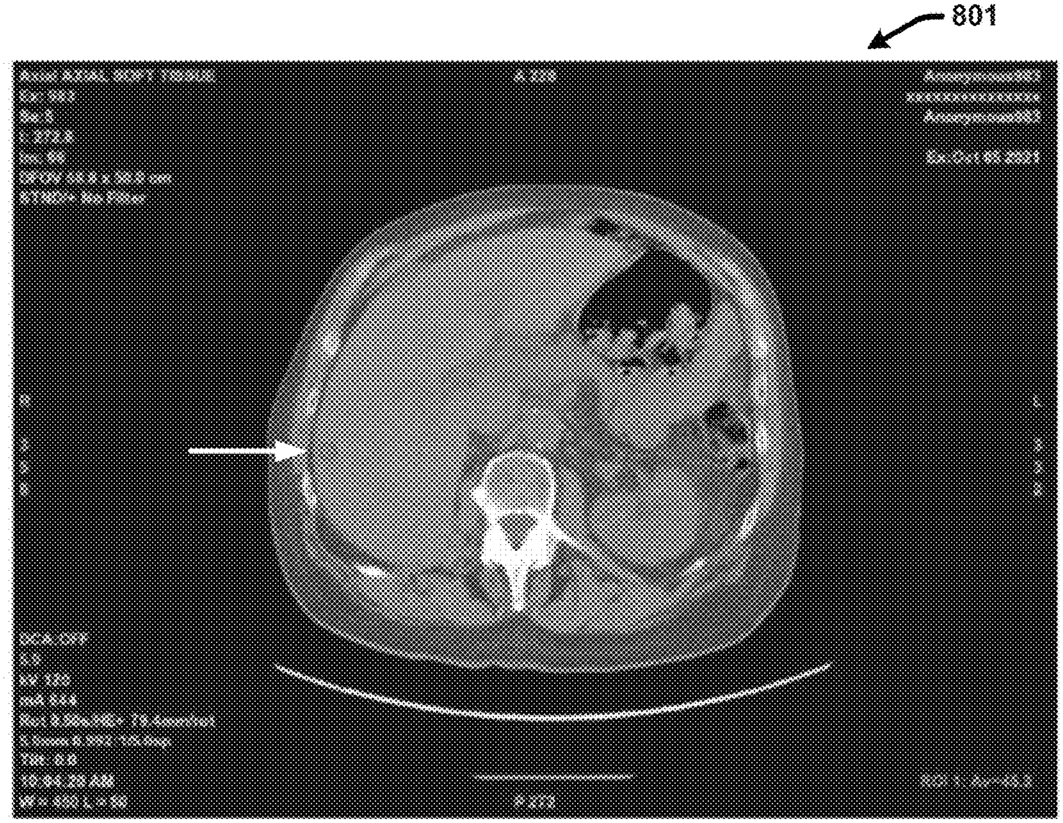
FIGS. 8A-11B present example CT images before and after CT value adjustment in accordance with one or more embodiments of the disclosed subject matter.
Figure 8B:
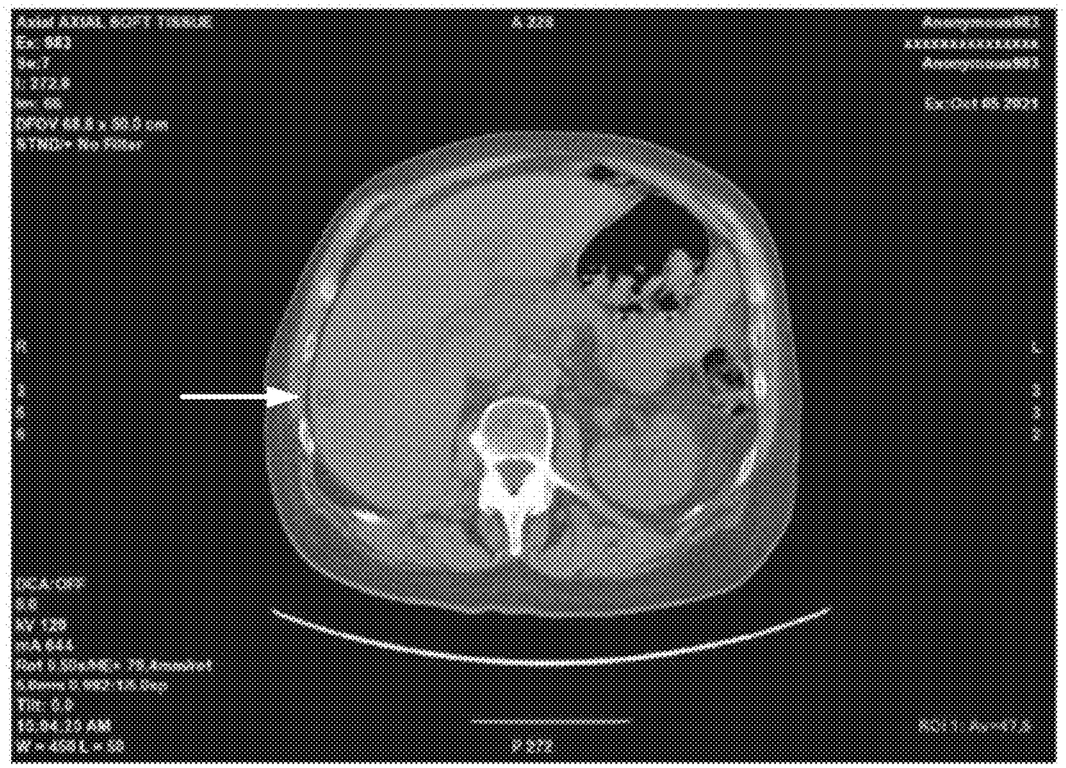

In this regard, with reference to FIGS. 8A and 8B, image 801 corresponds to an original CT image of the abdomen/pelvis and image 802 corresponds to the optimized version of the same CT image following CT value adjustment and reconstruction using the disclosed techniques. The uniform region from which the current and target CT values were extracted is indicated by the overlaid circle indicated by the arrow. Prior to optimization the current HU value for the uniform region in image 801 was 45.3. As a result of the CT value adjustment, the new HU value of the uniform region in image 802 is 47.5.

Figure 9A:
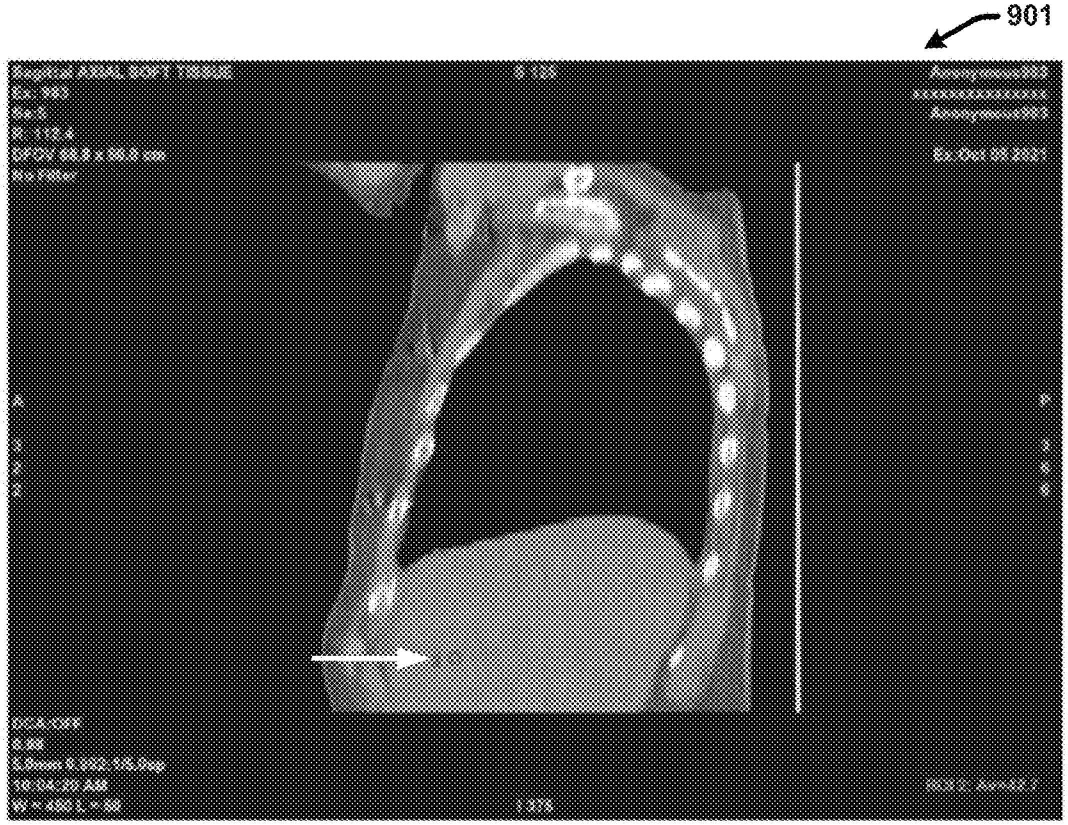
Figure 9B:
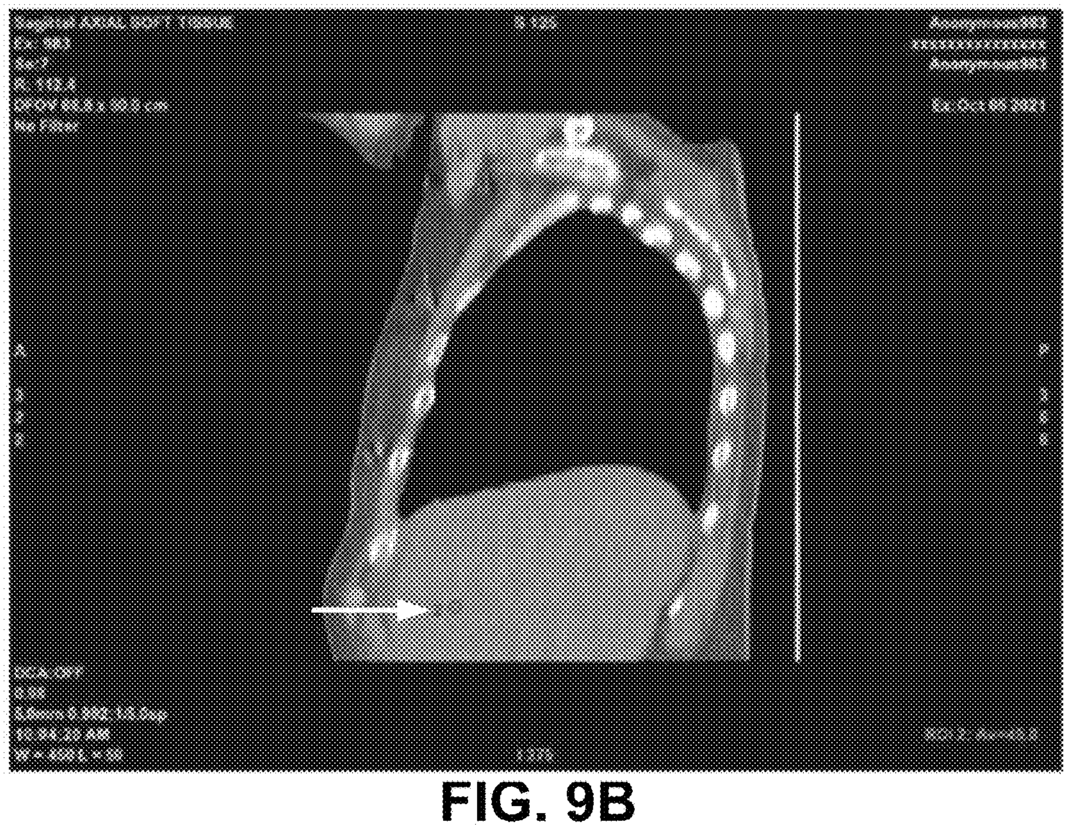

With reference to FIGS. 9A and 9B, image 901 corresponds to an original CT image of the abdomen/pelvis (sagittal view) and image 902 corresponds to the optimized version of the same CT image following CT value adjustment and reconstruction using the disclosed techniques. The uniform region from which the current and target CT values were extracted is indicated by the overlaid circle indicated by the arrow. Prior to optimization the current HU value for the uniform region in image 901 was 42.7. As a result of the CT value adjustment, the new HU value of the uniform region in image 902 is 45.0.

Figure 10A:
Figure 10B:

With reference to FIGS. 10A and 10B, image 1001 corresponds to an original CT image of the head (axial) and image 1002 corresponds to the optimized version of the same CT image following CT value adjustment and reconstruction using the disclosed techniques. The uniform region from which the current and target CT values were extracted is indicated by the overlaid circle indicated by the arrow. Prior to optimization the current HU value for the uniform region in image 1001 was 33. As a result of the CT value adjustment, the new HU value of the uniform region in image 1002 is 35.0.

Figure 11A:
Figure 11B:
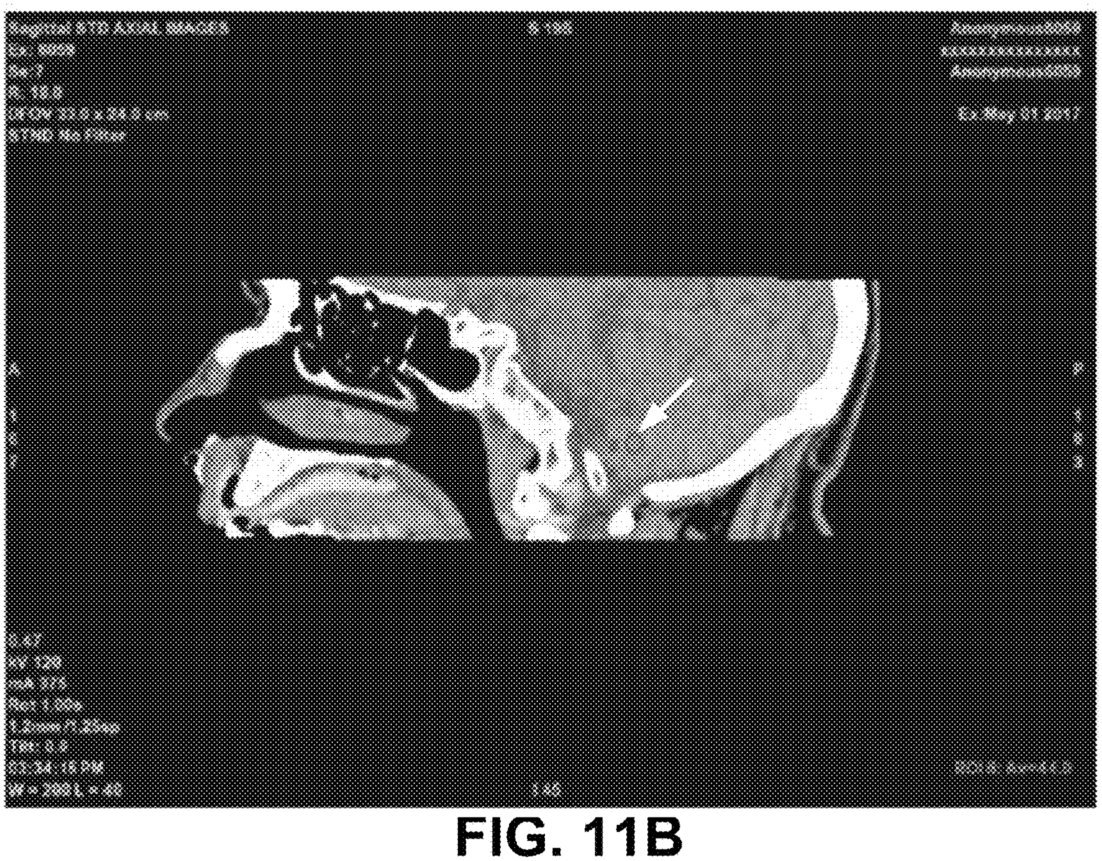

With reference to FIGS. 11A and 11B, image 1101 corresponds to an original CT image of the head (sagittal) and image 1102 corresponds to the optimized version of the same CT image following CT value adjustment and reconstruction using the disclosed techniques. The uniform region from which the current and target CT values were extracted is indicated by the overlaid circle indicated by the arrow. Prior to optimization the current HU value for the uniform region in image 1101 was 42.5. As a result of the CT value adjustment, the new HU value of the uniform region in image 1102 is 44.0.

Figure 12:
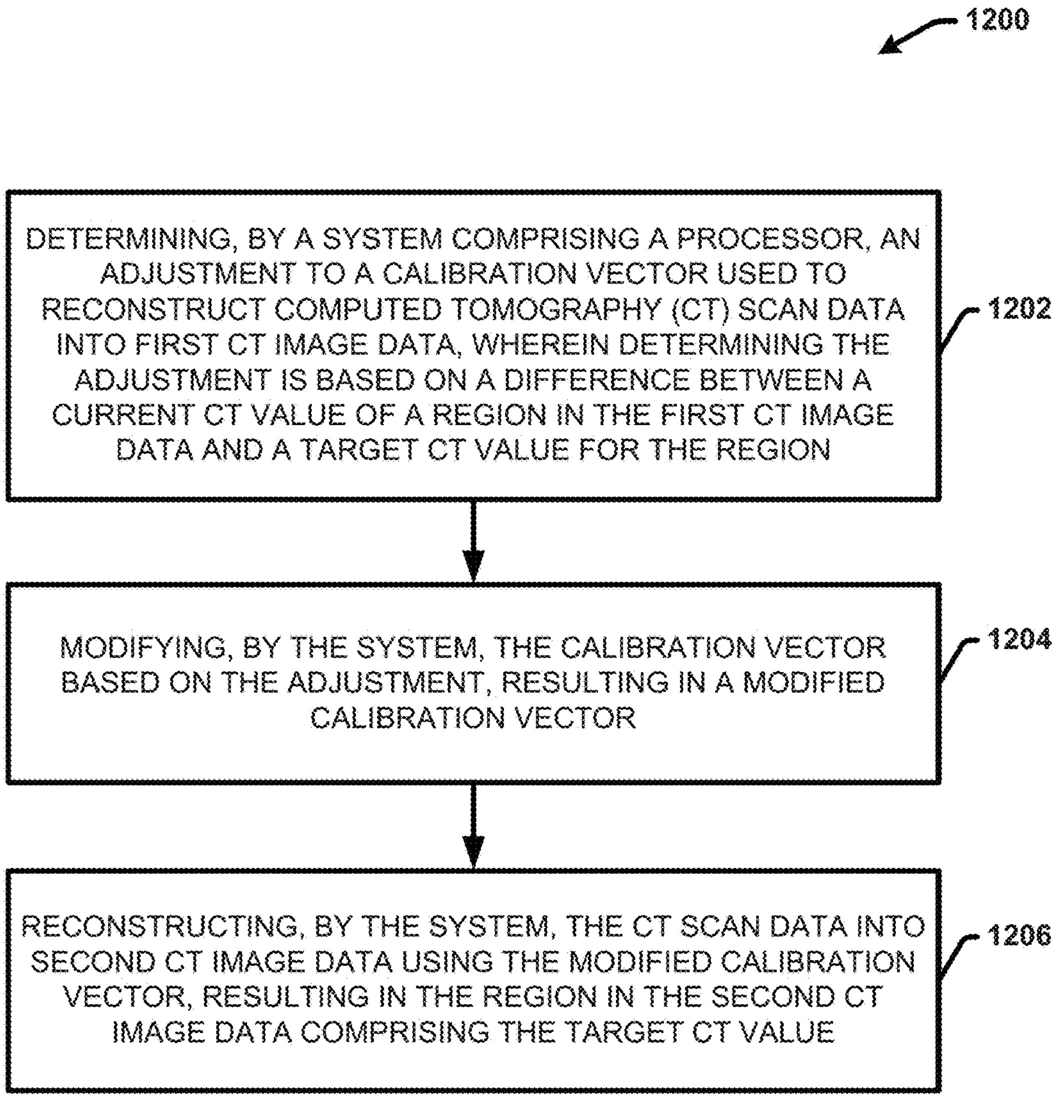
FIG. 12 presents a flow diagram of an example computer-implemented method for adjusting the CT values of CT images reducing streaks in accordance with one or more embodiments of the disclosed subject matter.

FIG. 12 presents a flow diagram of another example computer-implemented method 1200 for adjusting the CT values of CT images in accordance with one or more embodiments of the disclosed subject matter. In accordance with method 1200, at 1202 a system comprising a processor (e.g., system 100), determines an adjustment to a calibration vector used to reconstruct CT scan data into first CT image data (e.g., via assessment component 114), wherein determining the adjustment is based on a difference between a current CT value of a region in the first CT image data and a target CT value for the region. At 1204, method 1200 further comprises modifying, by the system, the calibration vector based on the adjustment (e.g., via adjustment component 116), resulting in a modified calibration vector. At 1206, method 1200 further comprises reconstructing, by the system (e.g., via reconstruction component 118), the CT scan data into second CT image data using the modified calibration vector, resulting in the region in the second CT image data comprising the target CT value. The reconstructed CT image data can comprise all or a subset of CT scan slices corresponding to the scanned anatomical volume. The reconstructed second CT image data and the modified calibration vector may be saved, rendered, and/or sent (e.g., transmitted via any suitable wired or wireless communication technology) to another device for rendering and/or additional processing.

One or more embodiments can be a system, a method, and/or a computer program product at any possible technical detail level of integration. The computer program product can include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, procedural programming languages, such as the "C" programming language or similar programming languages, and machine-learning programming languages such as like CUDA, Python, Tensorflow, PyTorch, and the like. The computer readable program instructions can execute entirely on the user's computer, partly on the user's computer, as a stand-alone software package, partly on the user's computer and partly on a remote computer or entirely on the remote computer or server using suitable processing hardware. In the latter scenario, the remote computer can be connected to the user's computer through any type of network, including a local area network (LAN) or a wide area network (WAN), or the connection can be made to an external computer (for example, through the Internet using an Internet Service Provider). In various embodiments involving machine-learning programming instructions, the processing hardware can include one or more graphics processing units (GPUs), central processing units (CPUs), and the like. For example, one or more of the disclosed machine-learning models (e.g., the image transformation model 908, the deep learning network 1010 and/or combinations thereof) may be written in a suitable machine-learning programming language and executed via one or more GPUs, CPUs or combinations thereof. In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 13, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 13:
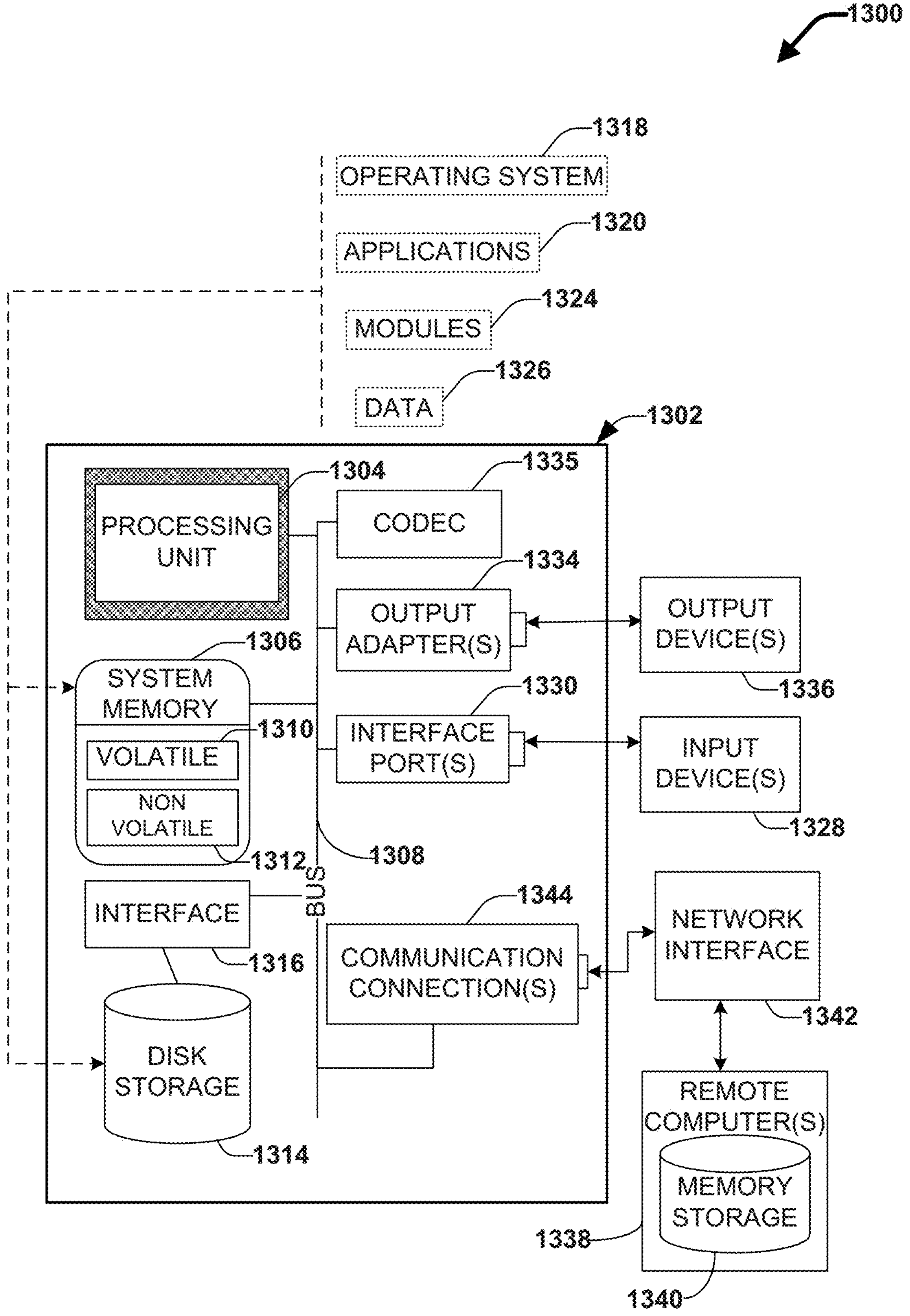
FIG. 13 illustrates a block diagram of an example, non-limiting operating environment in which one or more embodiments described herein can be facilitated.

With reference to FIG. 13, an example environment 1300 for implementing various aspects of the claimed subject matter includes a computer 1302. The computer 1302 includes a processing unit 1304, a system memory 1306, a codec 1335, and a system bus 1308. The system bus 1308 couples system components including, but not limited to, the system memory 1306 to the processing unit 1304. The processing unit 1304 can be any of various available processors. Dual microprocessors, one or more GPUs, CPUs, and other multiprocessor architectures also can be employed as the processing unit 1304.

The system bus 1308 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1306 includes volatile memory 1310 and non-volatile memory 1312, which can employ one or more of the disclosed memory architectures, in various embodiments. The basic input/output system (BIOS), containing the basic routines to transfer information between elements within the computer 1302, such as during start-up, is stored in non-volatile memory 1312. In addition, according to present innovations, codec 1335 can include at least one of an encoder or decoder, wherein the at least one of an encoder or decoder can consist of hardware, software, or a combination of hardware and software. Although, codec 1335 is depicted as a separate component, codec 1335 can be contained within non-volatile memory 1312. By way of illustration, and not limitation, non-volatile memory 1312 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1312 can employ one or more of the disclosed memory devices, in at least some embodiments. Moreover, non-volatile memory 1312 can be computer memory (e.g., physically integrated with computer 1302 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1310 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1302 can also include removable/non-removable, volatile/non-volatile computer storage medium. FIG. 13 illustrates, for example, disk storage 1314. Disk storage 1314 includes, but is not limited to, devices like a magnetic disk drive, solid state disk (SSD), flash memory card, or memory stick. In addition, disk storage 1314 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1314 to the system bus 1308, a removable or non-removable interface is typically used, such as interface 1316. It is appreciated that disk storage 1314 can store information related to a user. Such information might be stored at or provided to a server or to an application running on a user device. In one embodiment, the user can be notified (e.g., by way of output device(s) 1336) of the types of information that are stored to disk storage 1314 or transmitted to the server or application. The user can be provided the opportunity to opt-in or opt-out of having such information collected or shared with the server or application (e.g., by way of input from input device(s) 1328).

It is to be appreciated that FIG. 13 describes software that acts as an intermediary between users and the basic computer resources described in the suitable operating environment 1300. Such software includes an operating system 1318. Operating system 1318, which can be stored on disk storage 1314, acts to control and allocate resources of the computer 1302. Applications 1320 take advantage of the management of resources by operating system 1318 through program modules 1324, and program data 1326, such as the boot/shutdown transaction table and the like, stored either in system memory 1306 or on disk storage 1314. It is to be appreciated that the claimed subject matter can be implemented with various operating systems or combinations of operating systems.

A user enters commands or information into the computer 1302 through input device(s) 1328. Input devices 1328 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1304 through the system bus 1308 via interface port(s) 1330. Interface port(s) 1330 include, for example, a serial port, a parallel port, a game port, and a universal serial bus (USB). Output device(s) 1336 use some of the same type of ports as input device(s) 1328. Thus, for example, a USB port can be used to provide input to computer 1302 and to output information from computer 1302 to an output device 1336. Output adapter 1334 is provided to illustrate that there are some output devices 1336 like monitors, speakers, and printers, among other output devices 1336, which require special adapters. The output adapters 1334 include, by way of illustration and not limitation, video and sound cards that provide a means of connection between the output device 1336 and the system bus 1308. It should be noted that other devices or systems of devices provide both input and output capabilities such as remote computer(s) 1338.

Computer 1302 can operate in a networked environment using logical connections to one or more remote computers, such as remote computer(s) 1338. The remote computer(s) 1338 can be a personal computer, a server, a router, a network PC, a workstation, a microprocessor based appliance, a peer device, a smart phone, a tablet, or other network node, and typically includes many of the elements described relative to computer 1302. For purposes of brevity, only a memory storage device 1340 is illustrated with remote computer(s) 1338. Remote computer(s) 1338 is logically connected to computer 1302 through a network interface 1342 and then connected via communication connection(s) 1344. Network interface 1342 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1344 refers to the hardware/software employed to connect the network interface 1342 to the bus 1308. While communication connection 1344 is shown for illustrative clarity inside computer 1302, it can also be external to computer 1302. The hardware/software necessary for connection to the network interface 1342 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a memory that stores computer-executable components; and a processor that executes the computer-executable components stored in the memory, wherein the computer-executable components comprise:

an initialization component that receives a first computed tomography (CT) image reconstructed from projection data acquired during a CT scan on a patient, wherein the first CT image depicts an anatomical area of the patient;

an assessment component that determines an adjustment to a calibration vector used to reconstruct the projection data into the first CT image, wherein determining the adjustment is based on a difference between a current CT value of a region in the first CT image and a target CT value for the region;

an adjustment component that modifies the calibration vector based on the adjustment, resulting in a modified calibration vector; and a reconstruction component that reconstructs the projection data into a second CT image using the modified calibration vector, resulting in the region in the second CT image comprising the target CT value.

2. The system of claim 1, wherein the adjustment is based on a gain value determined, by the assessment component, to achieve the target CT value based on the current CT value, and wherein the adjustment component applies the gain value to the calibration vector to generate the modified calibration vector.

3. The system of claim 2, wherein the assessment component determines the gain value based on a transfer function that relates different gain values applied to the calibration vector to corresponding CT values in CT images generated from the projection data with respective versions of the calibration vector at the different gain values.

4. The system of claim 3, wherein the assessment component generates the transfer function.

5. The system of claim 2, wherein the projection data represents an anatomical volume of the patient, and wherein the reconstruction component reconstructs the projection data into a plurality of two-dimensional scan slices that collectively represent the anatomical volume using the modified calibration vector, and wherein the adjustment component applies the gain value across all rows of the modified calibration vector.

6. The system of claim 2, wherein the projection data represents an anatomical volume of the patient, wherein the second CT image comprises a two-dimensional scan slice that represents a selected slice of the anatomical volume, and wherein modified calibration vector applies the gain value to a single row of the modified calibration vector corresponding to the selected scan slice.

7. The system of claim 1, wherein the region comprises a uniform anatomical region attributed to a consistent CT value across different CT images for different patients.

8. The system of claim 7, wherein the initialization component determines the current CT value and the target CT value in response to reception of user input selecting an image pixel of the first CT image within the uniform anatomical region.

9. The system of claim 8, wherein the initialization component determines the target CT value using a look-up table indicating the target CT value for the uniform anatomical region.

10. The system of claim 1, wherein the computer executable components further comprise:

a segmentation component that identifies the uniform anatomical region based on segmentation of the first CT image using a segmentation model, and wherein the initialization component determines the current CT value based on an image pixel or region of pixels of the first CT image included in the uniform anatomical region, and determines the target CT value using a look-up table indicating the target CT value for the uniform anatomical region.

11. The system of claim 1, wherein the computer executable components further comprise:

a rendering component that renders the second CT image via a display.

12. A method, comprising:

receiving, by a system comprising a processor, a first computed tomography (CT) image reconstructed from projection data acquired during a CT scan on a patient, wherein the first CT image depicts an anatomical area of the patient;

determining, by the system comprising, an adjustment to a calibration vector used to reconstruct the projection data into the first CT image, wherein determining the adjustment is based on a difference between a current CT value of a region in the first CT image data and a target CT value for the region;

modifying, by the system, the calibration vector based on the adjustment, resulting in a modified calibration vector; and reconstructing, by the system, the projection data into a second CT image using the modified calibration vector, resulting in the region in the second CT image comprising the target CT value.

13. The method of claim 12, wherein determining the adjustment comprises determining a gain value for the calibration vector that achieves the target CT value based on the current CT value, and wherein the modifying comprises applying the gain value to the calibration vector to generate the modified calibration vector.

14. The method of claim 13, wherein determining the gain value comprises:

generating, by the system, a transfer function that relates different gain values applied to the calibration vector to corresponding CT values in CT images generated from the projection data with respective versions of the calibration vector at the different gain values, and determining, by the system, the gain value using the transfer function.

15. The method of claim 13, wherein the projection data represents an anatomical volume of the patient, wherein the modifying comprises applying, by the system, the gain value across all rows of the calibration vector to generate the modified calibration vector, and wherein the method further comprises:

reconstructing, by the system, the projection data into a plurality of two-dimensional scan slices that collectively represent the anatomical volume using the modified calibration vector.

16. The method of claim 13, wherein the projection data represents an anatomical volume of the patient, wherein the modifying comprises applying, by the system, the gain value to a single row of the calibration vector corresponding to a selected scan slice of the anatomical volume to generate the modified calibration vector, and wherein the second CT image comprises a two-dimensional image that represents the selected slice as a result of the applying.

17. The method of claim 12, further comprising:

determining, by the system, the current CT value and the target CT value in response to reception of user input selecting an image pixel of the first CT image within the-region.

18. The method of claim 17, wherein the region corresponds to a uniform anatomical region attributed to a consistent CT value across different CT images for different patients, and wherein the method further comprises:

determining, by the system, the target CT value using a look-up table indicating the target CT value for the uniform anatomical region.

19. The method of claim 12, wherein the region corresponds to a uniform anatomical region attributed to a consistent CT value across different CT images for different patients, and wherein the method further comprises:

identifying, by the system, the uniform anatomical region based on segmentation of the first CT image using a segmentation model;

determining, by the system, the current CT value based on an image pixel of the first CT image included in the uniform anatomical region; and determining, by the system, the target CT value using a look-up table indicating the target CT value for the uniform anatomical region.

20. A non-transitory machine-readable storage medium, comprising executable instructions that, when executed by a processor, facilitate performance of operations, comprising:

receiving a first computed tomography (CT) image reconstructed from projection data acquired during a CT scan on a patient, wherein the first CT image depicts an anatomical area of the patient;

determining an adjustment to a calibration vector used to reconstruct the projection data into the first CT image, wherein determining the adjustment is based on a difference between a current CT value of a region in the first CT image data and a target CT value for the region;

modifying the calibration vector based on the adjustment, resulting in a modified calibration vector; and reconstructing the projection data into a second CT image using the modified calibration vector, resulting in the region in the second CT image comprising the target CT value.

* * * * *